US005696221A

United States Patent [19]
Barksby et al.

[11] Patent Number: 5,696,221
[45] Date of Patent: Dec. 9, 1997

[54] POLYURETHANE/UREA HEAT-CURED AND MOISTURE-CURED ELASTOMERS WITH IMPROVED PHYSICAL PROPERTIES

[75] Inventors: Nigel Barksby, Dunbar; Bruce D. Lawrey, Charleston, both of W. Va.; Susan M. Clift, Lansdale, Pa.

[73] Assignee: ARCO Chemical Technology, L.P., Greenville, Del.

[21] Appl. No.: 680,734

[22] Filed: Jul. 15, 1996

[51] Int. Cl.$^6$ .................. C08G 18/10; C07C 257/00
[52] U.S. Cl. .................. 528/64; 528/59; 528/61; 528/65; 528/66; 528/75; 528/76; 528/85; 560/25; 560/26; 560/330; 560/360
[58] Field of Search .................. 528/59, 61, 45, 528/66, 75, 76, 85, 64; 560/25, 26, 330, 360

[56] References Cited

U.S. PATENT DOCUMENTS

| | | |
|---|---|---|
| 3,393,243 | 7/1968 | Cuscurida . |
| 3,427,256 | 2/1969 | Milgrom . |
| 3,427,334 | 2/1969 | Belner . |
| 3,427,335 | 2/1969 | Herold . |
| 3,829,505 | 8/1974 | Herold . |
| 3,941,849 | 3/1976 | Herold . |
| 3,963,681 | 6/1976 | Kaneko et al. . |
| 4,239,879 | 12/1980 | Fabris et al. . |
| 4,282,387 | 8/1981 | Olstowski et al. . |
| 4,687,851 | 8/1987 | Laughner ..................... 544/398 |
| 4,934,425 | 6/1990 | Gajewski et al. . |
| 5,010,117 | 4/1991 | Herrington et al. . |
| 5,010,187 | 4/1991 | Heuvelsland . |
| 5,077,371 | 12/1991 | Singh et al. . |
| 5,100,997 | 3/1992 | Reisch et al. . |
| 5,114,619 | 5/1992 | Heuvelsland . |

OTHER PUBLICATIONS

"Comparison of the Dynamic Properties of Polyurethane Elastomers Based on Low Unsaturation Polyoxypropylene glycols and Poly(tetramethylene oxide) Glycols", Polyurethane World Congress 1993, Oct. 10–13, 1993, pp. 388–399.
"Urethane Applications for Novel High Molecular Weight Polyols", 32nd Annual Polyurethane Technical/Marketing Conference, Oct. 1–4, 1989, pp. 139–142.

*Primary Examiner*—John M. Cooney, Jr.
*Attorney, Agent, or Firm*—Jonathan L. Schuchardt

[57] ABSTRACT

Elastomers with improved physical properties, particularly hardness and rebound, may be prepared by the diamine chain extension or moisture cure of low isocyanate group content, toluene diisocyanate-based prepolymers prepared from a polyol component comprising a high molecular weight, low unsaturation polyoxypropylene diol and a low molecular weight diol. The elastomers are useful for applications such as rollers and other applications where hardness and rebound are important.

27 Claims, No Drawings ic weight PTMEG of 1000
POLYURETHANE/UREA HEAT-CURED AND MOISTURE-CURED ELASTOMERS WITH IMPROVED PHYSICAL PROPERTIES

TECHNICAL FIELD

The present invention pertains to polyurethane/urea heat-cured elastomers prepared by the amine chain extension or moisture cure of toluene diisocyanate-based, isocyanate-terminated prepolymers. More particularly, the present invention pertains to polyurethane/urea elastomers derived from prepolymers prepared by reacting a stoichiometric excess of toluene diisocyanate with a polyol component comprising a high molecular weight, low unsaturation polyoxypropylene polyol and a very low molecular weight polyol. The subject elastomers have higher rebound and hardness than otherwise similar elastomers having the same hard segment content. Films prepared from the compositions have exceptional tensile strengths.

BACKGROUND ART

Polyurethane heat-cured elastomers may, in general, be subdivided into two major classes distinguished by the type of monomeric isocyanate used to prepare the elastomer precursor prepolymer. When methylene diphenylene diisocyanate (MDI) or MDI variants are used to form the prepolymers, the isocyanate group to polyol hydroxyl equivalent ratio may be quite high. The range of isocyanate group content possible provides flexibility in formulating. However, the high reactivity of the MDI isocyanate groups generally requires use of diol chain extenders in cast elastomer systems, as amines with suitable reactivity are not commercially available. To maintain a desirable balance of properties, elastomers prepared from MDI are thus polyurethane elastomers and not polyurethane/urea elastomers which have a distinct status in the art.

Heat-cured polyurethane/urea elastomers should not be confused with reaction injection molded polyurethane/urea (RIM) systems. In the latter, MDI and modified MDIs are generally used in conjunction with a reactive diamine such as diethyltoluene diamine and injected into highly rigid molds at high pressures. Prepolymers are generally not used in such systems except in minor amount, since in the very short period prior to gelation, the rapidly reacting mixture must traverse the entire, often complex mold. Thus, low viscosity systems are desired, in conjunction with very high pressure, short duration injection. RIM processes have acquired a separate status in the art. RIM system are not heat-cured, but rather rapidly cure without heat.

Toluene diisocyanate (TDI) based elastomers are the second major heat-cured elastomer class, and the largest class in terms of elastomer produced. Approximately 65 percent of heat-cured polyurethane elastomers are TDI-based systems. In practice, TDI-based prepolymers having high isocyanate group content are seldom used, and amine rather than diol chain extenders are employed to provide hard segments having urea linkages. The resulting elastomers are thus polyurethane/urea elastomers. High isocyanate group contents are generally avoided with TDI-based prepolymers due to the volatility of TDI. Toluene diisocyanate, as a mixture of predominately 2,4- and 2,6-isomers, is a liquid having a boiling point of c.a. 251° C., and exhibits an appreciable vapor pressure at commonly encountered ambient temperatures. The amount of TDI vapor released into the environment is minimized by lowering the isocyanate to hydroxyl group equivalent ratio of the TDI-derived prepolymer. In this manner, virtually all the volatile TDI is caused to react during the preparation of the prepolymer, leaving little, if any, free isocyanate. The isocyanate-terminated prepolymers, being of much higher molecular weight than the monomeric isocyanate, do not have appreciable volatility nor vapor pressure at ordinary temperatures. Of course, it is possible to prepare prepolymers using larger amounts of TDI and remove excess unreacted TDI by conventional methods such as thin film evaporation, low pressure distillation, etc. However, while the nature of the isocyanate-terminated prepolymers may vary somewhat due to the presence of excess isocyanate, the isocyanate group content of the final prepolymer is still limited.

Due to the limited NCO/OH ratio, the % NCO content of the isocyanate-terminated prepolymers derived from TDI is limited to a maximum of about 10% by weight. At such limited isocyanate contents, formulation flexibility is reduced. Moreover, as the urea hard segment content is related to the isocyanate group content in amine cured systems, preparation of elastomers with high tensile strength and other desirable physical properties is rendered more difficult.

Many attempts have been made to increase polyurethane elastomer physical properties, and many have been successful in elevating certain physical properties, but often at the expense of others. For example, in U.S. Pat. No. 4,934,425 the preparation of polyurethane/urea elastomers having improved dynamic properties is exemplified. The elastomers were prepared from TDI-based prepolymers containing a high molecular weight polytetramethylene ether glycol (PTMEG) of 2000 Daltons (hereinafter Da) molecular weight and a moderate molecular weight PTMEG of 1000 Da molecular weight. Elastomers prepared from the blended prepolymers showed considerable improvement in resistance to heat build-up in rubber tire applications, indicative of lower hysteresis. However, while dynamic properties improved, no improvement was noted with respect to tensile strength, elongation, or hardness.

In U.S. Pat. No. 3,963,681 the preparation of polyurethane/urea elastomers with improved cut-growth and flex-crack resistance for tire applications is disclosed. The TDI-based prepolymers were prepared from a blend of a very high molecular weight PTMEG (molecular weight above 4500 Da) and a moderate molecular weight PTMEG, the blend having an average molecular weight of between 1000 Da and 4500 Da. The molecular weight of the higher molecular weight PTMEG is required to be higher than the "critical molecular weight" of PTMEG polymers, while the molecular weight of the lower molecular weight component must be less than this value. Tensile strengths as well as cut-growth were improved. However, not all polyether polyols are known to have a "critical molecular weight." Furthermore, the molecular weights are very critical; blends of 800 Da PTMEG and 3800 Da PTMEG are disclosed as being unsuitable, for example.

U.S. Pat. No. 5,077,371 addressed hardness build in polyurethane/urea cast elastomers. The rate of hardness build is important as cast elastomer parts cannot be demolded prior to developing adequate green strength without risk of damage to the parts. Rapid development of hardness allows more rapid demold. Cure can be completed in an oven outside the mold, and production rates increased correspondingly. The addition of the dimer of toluene diisocyanate (TDI dimer) in amounts of 0.3 to 6 weight percent of total isocyanate to the isocyanate component used to prepare bimodally distributed PTMEG prepolymers was found to increase the rate of hardness build. Unfortunately, of the remaining physical properties, hardness, elongation, and rebound remained virtually unchanged, tensile strength and particularly elongation actually decreased, and only tear strength showed significant improvement. The necessity of preparing the TDI dimer adds additional time and expense to elastomer formulation.

PTMEG has been traditionally used in preparing high performance polyurethane/urea elastomers, as illustrated by the three foregoing U.S. Pat. Nos. 4,934,425, 3,963,681, and 5,077,371. PTMEG is a premium priced polyol. However, PTMEG continues to be used today despite its much greater cost as compared to polyoxyalkylene polyols such as polyoxyethylene glycols and polyoxypropylene glycols, due to the desirable physical properties of the polyurethane which may be obtained through its use.

Moisture-cured polyurethane elastomers are often used as caulks and sealants. Rather than incorporating a diamine to react with isocyanate to form the linking urea hard segments, moisture-cured elastomers rely on the reaction of free isocyanate groups with moisture to form urea linkages. Many moisture-cured films and sealants exhibit relatively low physical properties, particularly tensile strength and/or tear strength, and therefore improvement in these and other properties is desired.

The majority of polyoxyalkylene polyether polyols are polymerized through base catalysis. For example, polyoxypropylene diols are prepared by the base catalyzed oxypropylation of a difunctional initiator such as propylene glycol. During base catalyzed oxypropylation, a competing rearrangement of propylene oxide to allyl alcohol continually introduces an unsaturated, monofunctional, oxyalkylatable species into the reactor. The oxyalkylation of this monofunctional species yields allyl-terminated polyoxypropylene monols. The rearrangement is discussed in BLOCK AND GRAFT POLYMERIZATION, Vol. 2, Ceresa, Ed., John Wiley & Sons, pp. 17–21. Unsaturation is measured in accordance with ASTM D-2849-69 "Testing Urethane Foam Polyol Raw Materials," and expressed as milliequivalents of unsaturation per gram of polyol (meq/g).

Due to the continual creation of allyl alcohol and its subsequent oxypropylation, the average functionality of the polyol mixture decreases and the molecular weight distribution broadens. Base-catalyzed polyoxyalkylene polyols contain considerable quantities of lower molecular weight, monofunctional species. In polyoxypropylene diols of 4000 Da molecular weight, the content of monofunctional species may lie between 30 and 40 mol percent. In such cases, the average functionality is lowered to c.a. 1.6 to 1.7 from the nominal, or theoretical functionality of 2.0. In addition, the polyols have a high polydispersity, $M_w/M_n$, due to the presence of the substantial, low molecular weight fractions. Molecular weights and equivalent weights herein in Da (Daltons) are number average molecular weights and number average equivalent weights, respectively, unless specified otherwise.

Some researchers in the past have suggested using low unsaturation, higher functionality polyols to improve elastomer physical properties. See, e.g. U.S. Pat. Nos. 4,239,879 and 5,100,997. For example, A. T. Chen et al., "Comparison of the Dynamic Properties of Polyurethane Elastomers Based on Low Unsaturation Polyoxypropylene Glycols and Poly(tetramethylene oxide) Glycols," POLYURETHANES WORLD CONGRESS 1993, Oct. 10–13, 1993, pp. 388–399 compared the properties of PTMEG-derived elastomers with those from conventional polyoxypropylene diols and low unsaturation polyoxypropylene diols. In Shore A 90 cast elastomers, PTMEG-MDI prepolymer-derived, butanediol extended polyurethane elastomers had slightly lower modulus and elongation than low unsaturation polyoxypropylene diol-derived elastomers, however tensile strength of the PTMEG elastomers was considerably higher. For polyurethane/urea cast elastomers, a direct comparison was not possible, as the only PTMEG example used a 1000 Da PTMEG while both low unsaturation polyoxypropylene diol examples employed c.a. 2000 Da molecular weight diols. The PTMEG example had considerably higher physical properties with the exception of elongation, which was to be expected. Notably, conventional, base-catalyzed polyoxypropylene diols produced polyurethane/urea cast elastomers with physical properties virtually indistinguishable from those prepared from low unsaturation diols.

Reducing unsaturation in polyoxyalkylene polyols by lowering catalyst concentration and decreasing the reaction temperature is not feasible, as the reaction rate is so slow that oxypropylation takes days or even weeks, although low unsaturation polyols may be prepared in this manner. Thus, efforts have been expended to discover catalysts which can produce polyoxy-propylated products in a reasonable amount of time with little introduction of monofunctionality due to allylic species. In the early 1960's, for example, double metal cyanide catalysts such as zinc hexacyanocobaltate complexes were developed as illustrated by U.S. Pat. Nos. 3,427,256; 3,427,334; 3,427,335; 3,829,505; and 3,941,849. Despite lowering unsaturation to the range of c.a. 0.018 meq/g, the cost of these catalysts coupled with the necessity of lengthy and expensive catalyst removal steps prevented commercialization.

Use of alternative basic catalysts such as cesium hydroxide and rubidium hydroxide as disclosed in U.S. Pat. No. 3,393,243, and the barium and strontium oxides and hydroxides, as disclosed in U.S. Pat. Nos. 5,010,187 and 5,114,619, enabled modest improvements in unsaturation, however catalyst expense, and in some cases, toxicity, coupled with the but modest improvements offered, mitigated against commercialization. Catalysts such as calcium naphthenate and combinations of calcium naphthenate and tertiary amines have proven successful, as disclosed in U.S. Pat. Nos. 4,282,387, 4,687,851 and 5,010,117, in preparing polyols with unsaturations as low as 0.016 meq/g, and more generally in the range of 0.02 to 0.04 meq/g.

In the 1980's, double metal cyanide complex (DMC) catalysts were once more revisited, and improvements in catalytic activity and catalyst removal methods encouraged one manufacturer to offer DMC catalyzed polyols having unsaturations in the range of 0.015 to 0.018 meq/g commercially for a brief time. However, base catalysis continued to be the major method of preparing polyoxypropylene polyols, and continues its dominance to the present day.

Recently, however, further major advances in DMC catalysts and polyoxyalkylation processes by the ARCO Chemical Co. have enabled practical preparation of ultra low unsaturation polyoxypropylene polyols. High molecular weight polyols, for example those in the 4000 Da to 8000 Da molecular weight range, typically exhibit unsaturation in the range of 0.004 to 0.007 meq/g when catalyzed by the novel DMC catalysts. At these levels of unsaturation, the amount of monofunctional species is only 2 mol percent or less. Moreover, GPC analysis shows the polyols to be virtually monodisperse, often exhibiting polydispersities less than 1.10. Several such polyols have recently been commercialized as ACCLAIM™ polyols.

However, the advent of low unsaturation, higher functionality polyols has not proven to be the panacea those skilled in the art expected. In many systems, replacement of conventional polyols with very low unsaturation polyols causes system failure, and considerable efforts in reformulation must be expended. In other cases, the low unsaturation polyols could be readily substituted, but expected improvements did not materialize. The reasons for the unexpected difficulties associated with the use of low unsaturation polyols are not known with certainty.

However, the formulation of conventional polyurethane systems employs polyether polyols whose actual and theoretical functionality differ, often considerably. For example, a conventional, base-catalyzed 6000 Da triol may have an actual functionality of only c.a. 2.4 due to the presence of 30 to 40 mol percent monol. Substituting a polyol blend of a low unsaturation, high functionality diol and low unsaturation, high functionality triol to mimic the 2.4 functionality does not provide the same functionality distribution as the conventional polyol. The triol portion of the conventionally catalyzed triol produces three-way branched "crosslink" sites, while the monofunctional portion acts as a chain terminator. In a diol/triol blend having the same functionality, the number of three-way branched sites is less, but there are no monofunctional chain terminators.

Use of polyols having low content of monofunctional species has been suggested as a method of increasing polymer molecular weight; and increased polymer molecular weight has, in turn, sometimes been cited as desirable in producing higher performance polymers. However, high molecular weight is not necessarily a desirable feature in many polymer systems. As indicated by G. Odian, PRINCIPLES OF POLYMERIZATION, John Wiley & Sons, ©1981, pp. 20–21, for example, often, the molecular weight to be desired is a moderate rather than a high molecular weight. In engineering thermoplastics, for example, higher molecular weights in general increase tensile strength, melt temperature, modulus, and the like, but if the molecular weight is too high, polymer viscosity becomes too great to process. In polyurethanes, molecular weights are far lower than engineering thermoplastics, and polymer morphology and physical properties are influenced by many factors, including amount and nature of hard segment, stereochemistry of isocyanate used, etc. Often, formulations must be chosen to balance conflicting properties. For example, increases in tensile strength are often accompanied by a decrease in elongation.

For example, R. Mascioli, in "Urethane Applications for Novel High Molecular Weight Polyols," 32ND ANNUAL POLYURETHANE TECHNICAL/MARKETING CONFERENCE, Oct. 1–4, 1989, pp. 139–142, discloses that the substitution of a low unsaturation, 10–11,000 Da triol for a conventional 6000 Da triol in a polyurethane foam formulation resulted in a foam which was stiff and boardy. A softer foam would have been expected, due both to the longer, and therefore more flexible, polyoxypropylene branch length of the triol; and a lower crosslink density. Substitution of higher molecular weight, low unsaturation polyols for conventionally catalyzed polyols whose molecular weight is limited, has also been touted as a means of using less of the more expensive isocyanate in polyurethane manufacture. However, suitable formulations must be developed.

In the area of high resilience polyurethane flexible foams, it has been discovered, as disclosed in copending U.S. application Ser. No. 08/565,516, that substitution of a DMC-catalyzed, low unsaturation polyol for a conventionally, base catalyzed polyol of similar molecular weight and composition in a high resilience polyurethane foam system may result in foam collapse. It is now believed by some that this anomalous behavior may be due to a very small amount of a very high molecular weight component, with a molecular weight in the range of 100,000 Da and higher. This exceptionally high molecular weight component, even though very small in amount, may act as a surfactant and tend to destabilize polyurethane foam, or may serve to increase viscosity, thereby interfering with normal curing mechanisms such as hard segment phase out.

Therefore, the formulation of polyurethane systems which can extol the benefits of the higher molecular weights, higher functionalities, low polydispersity, and lower unsaturation and attendant lack of monofunctional species exhibited by low unsaturation polyols such as those prepared through DMC catalysis requires non-obvious and unorthodox reformulation.

SUMMARY OF THE INVENTION

The present invention pertains to polyurethane/urea elastomers prepared by the amine chain extension or moisture cure of isocyanate-terminated prepolymers prepared by reacting toluene diisocyanate with a mixture containing a high molecular weight, very low unsaturation polyoxypropylene diol and a low molecular weight diol, the mixture having a hydroxyl number between 50 and 200. The chain extended cured elastomers surprisingly have higher hardness and rebound than elastomers having similar hard segment content prepared from a single polyol of equivalent hydroxyl number, even when a low unsaturation polyol is employed as the single polyol. The moisture-cured elastomers exhibit exceptional and surprising physical properties.

DESCRIPTION OF THE PREFERRED EMBODIMENTS

The subject invention amine chain extended elastomers are prepared by reacting the toluene diisocyanate-derived prepolymer described hereafter with a diamine chain extender at an isocyanate index of from about 90 to about 120, preferably 95 to 110, and most preferably 100–105. As is well known, the isocyanate index is the ratio of equivalents of isocyanate to equivalents of isocyanate reactive species multiplied by 100. In determining the equivalents of isocyanate reactive species, one mol of amino groups constitutes one equivalent. The moisture-cured elastomers are cured in the presence of atmospheric moisture or in a humidifying chamber.

The amine chain-extended cast elastomers are processed by intensively mixing the prepolymer-containing A-side and diamine-containing B-side, degassing under vacuum if necessary, and introducing the mixture into an open or closed mold. The elastomers may be removed from the mold following development of sufficient green strength to allow demolding and handling, and are generally post-cured at slightly elevated temperature. Alternatively, the elastomer may be subjected to cure in the mold itself. Methods of preparing the elastomer per se are conventional, and reference may be made to the appropriate portions of POLYURETHANES: CHEMISTRY AND TECHNOLOGY, J. H. Saunders and K. C. Frisch, Interscience Publishers, New York, 1963; and to the POLYURETHANE HANDBOOK, Gunter Oertel, Ed., Hanser Publishers, Munich, ©1985, both of which are incorporated herein by reference. The moisture-cured elastomers may be formulated with traditional fillers, rheology control agents, thixotropes, and the like, or may be extruded or cast as neat films or from solution.

The isocyanate-terminated prepolymers are prepared by reacting toluene diisocyanate with a polyol component as described below. The toluene diisocyanate (TDI) may be provided as an 80:20 or 65:35 weight ratio of the 2,4- and 2,6-isomers, although other mixtures of isomers in other proportions are useful as well. However, essentially pure 2,4-TDI is preferred. It would not depart from the spirit of the invention to include a minor amount of another isocyanate or mixture of isocyanates, such as 2,2'-, 2,4'-, or 4,4'-MDI, polymeric MDI, TDI variants, MDI variants, aliphatic isocyanates, cycloaliphatic isocyanates, or the like, provided such addition does not materially alter the properties of the prepolymer. However, it is preferred that the isocyanate be essentially all TDI, i.e. greater than 90 to 95 weight percent TDI, and it is also preferable to use commercially available isomers or their mixtures for reasons of economy. In general, while TDI isomer(s) are most preferred, either singly or as mixtures, mixtures of such TDI isomer(s) with a minor quantity, i.e. less than 30 weight percent of MDI isomer(s) or with modified MDI such as carbodiimide-modified MDI are also preferred.

The polyol component to be reacted with the TDI to form the prepolymer is a mixture of at least two hydroxyl-functional components, the first being a low molecular weight diol having a molecular weight less than about 400 Da, the second being a low unsaturation polyoxypropylene glycol having a molecular weight of c.a. 2000 Da or higher, such that the mixture of the at least two components has a hydroxyl number in the range of about 50 to about 200.

The low molecular weight diol may be any dihydroxyl functional compound having a molecular weight below about 400 Da. Illustrative, but non-limiting examples, include ethylene glycol, diethylene glycol, triethylene glycol, propylene glycol, dipropylene glycol, tripropylene glycol, 1,3-propanediol, 2-methyl-1,3-propane diol, neopentyl glycol, 1,3- and 2,3-butylene glycol, 1,4-butanediol, 1,5-pentanediol, 1,6-hexanediol, 1,8-octanediol, 1,4-cyclohexanediol, 1,4-cyclohexanedimethanol, hydroquinone bis[2-hydroxyethyl ether], and the various bisphenols and their bis[hydroxyalkyl ether] derivatives. Oxyalkylation products of the above are also useful. Preferably, the low molecular weight diol has a molecular weight below about 150 Da, most preferably about 120 Da or lower. Mixtures of one or more of such low molecular weight diols are also useful. Minor quantities of low molecular weight triols, tetrols or the like, such as glycerine, trimethylol propane, pentaerythritol, or the like may be added to the low molecular weight diol mixture as long as the amount of triol, tetrol, or higher functionality species is about 10 mol percent or less. "Low molecular weight diol" allows such amounts of higher functional species unless indicated otherwise.

The low unsaturation polyoxypropylene glycol has a molecular weight of about 2000 Da or higher, preferably from 2000 Da to 12,000 Da, more preferably from 3000 Da to 10,000 Da, and most preferably from 4000 Da to 8000 Da. The unsaturation must be below 0.020 meq/g, is preferably below 0.015 meq/g, and most preferably below 0.010 meq/g. Unsaturation of from about 0.002 meq/g to about 0.007 meq/g is preferred. To achieve the requisite low unsaturation, any catalytic method which is useful for obtaining the desired molecular weight and unsaturation may be used. However, it is desirable to employ double metal cyanide complex catalysts as the oxyalkylation catalyst. Catalysts of this type are disclosed in U.S. Pat. Nos. 5,470,813 and 5,482,908, for example, and are capable of preparing polyols in the molecular weight range of 2000 Da to 12,000 Da with unsaturation typically in the range of about 0.004 to 0.007 meq/g. More than one low unsaturation polyoxypropylene diol may be used in admixture with the low molecular weight diol components.

The blend of low molecular weight diol and low unsaturation polyoxypropylene diol must have a hydroxyl number between 50 and 200, preferably between 75 and 150, and most preferably in the range of 90 to 120. Hydroxyl number is calculated by adding the weight fractional hydroxyl numbers of the individual components of the mixture, the weight fractional hydroxyl number being the weight fraction of the component multiplied by the component's hydroxyl number. It must be emphasized that it is the blend of high molecular weight species and low molecular weight species used to prepare the prepolymer which provides the exceptional qualities of the subject invention cast elastomers. These properties cannot be duplicated with single components, nor with bimodal blends not containing species below about 400 Da molecular weight.

Preparation of the prepolymer is by standard techniques. For example, the polyol component and isocyanate component may be mixed thoroughly, generally under a nitrogen blanket, and agitated until the isocyanate group content drops to a steady value, indicating that the reaction is finished. The mixture is advantageously modestly heated, for example to temperatures in the range of 50° C. to 70° C. Urethane reaction-promoting catalysts such as the various well known tin catalysts, amine catalysts, or other catalysts which promote the reaction between isocyanate and hydroxyl groups may be used if desired. The reaction may be batch, semibatch, or continuous. Examples of prepolymer preparation may be found in POLYURETHANES: CHEMISTRY AND TECHNOLOGY, POLYURETHANES HANDBOOK, in U.S. Pat. No. 5,278,274, and, Canadian Published Application 2,088,521, which are herein incorporated by reference.

The chain extenders useful in the subject invention are the conventional diamine chain extenders known to those skilled in the art. Preferred chain extenders are the sterically hindered or electrically deactivated aromatic diamines. Examples of the former include the various ring alkylated toluene diamines, methylenedianilines such as 3,5-diethyltoluenediamine (DETA) and like compounds such as those disclosed in U.S. Pat. No. 4,218,543. Examples of aromatic diamines which are rendered less active by electrical effects of ring substituents include 4,4'-methylene-bis (2-chloroaniline) (MOCA or MbOCA) and 4,4'-methylene-bis( 3-chloro-2,6-diethylaniline) (MCDEA). Diamines without steric hindrance or ring deactivating groups generally tend to react very rapidly, and may result in insufficient pot life to fill the mold, particularly when complex molds are used. Thus, the slower reacting diamines are generally preferred. The diamine chain extenders may also be used with minor amounts of diol chain extenders and crosslinkers such as ethylene glycol, 1,4-butanediol, diethanolamine, triethanolamine, and the like. The amount of hydroxyl-functional chain extender must be kept low, otherwise hardness will decrease as will also the rate of cure, thus requiring longer demold times. Preferably, the substantial majority, i.e. greater than 80 mol percent of the chain extender is a diamine chain extender.

Catalysts may also be useful in certain systems. Catalysts have been described previously with respect to prepolymer formation, and suitable catalysts are well known to those skilled in the art. Many examples of suitable catalysts may be found in the POLYURETHANE HANDBOOK, pp. 90–95, and POLYURETHANES: CHEMISTRY AND TECHNOLOGY, pp. 129–217, both incorporated herein by reference.

Conventional additives and auxiliaries may be added as well, including but not limited to fillers, plasticizers, dyes, pigments, UV stabilizers, thermal stabilizers, antioxidants, flame retardants, conductivity agents, internal mold release agents, and the like. Polymer solids, for example, vinyl polymer solids as found in polymer polyols and isocyanate-derived solids such as those found in PIPA and PHD polyols may be included as well, for example by using an appropriate polymer polyol dispersion having as its "base," or "carrier" polyol, a low unsaturation polyoxypropylene diol. If the amount of polymer solids desired is low, a minor quantity of high solids polymer polyol dispersion prepared from a conventionally catalyzed polyol may be used.

The polyoxypropylene diol may contain oxyethylene moieties, introduced, for example, by the random copolymerization or capping with ethylene oxide along with propylene oxide during preparation of the polyol. The amount of ethylene oxide should generally be 40 weight percent or less, preferably less than 20 weight percent, and more preferably about 5 to about 15 weight percent. If the polyoxypropylene diols containing oxyethylene moieties are to be prepared using double metal cyanide complex catalysis, it is preferred that the ethylene oxide be present during a substantial portion of the oxypropylation.

The polyoxypropylene diol may also contain minor amounts of higher alkylene oxides, particularly oxetane, 2,3-butylene oxide, 1,2-butylene oxide, and the like. The amount of higher alkylene oxide should generally be limited to less than about 10 weight percent. Most preferably, the polyoxypropylene diol contains substantially all oxypropylene moieties, or oxypropylene moieties with not more than about 10 weight percent random oxyethylene moieties. The low unsaturation polyoxypropylene diol may also contain a minor amount of a conventionally, base-catalyzed polyoxypropylene diol, provided that the amount of such conventional diol not exceed 20 mol percent of the total high molecular weight diol, and the unsaturation of the high molecular weight portion of the diol mixture be less than 0.020 meq/g, preferably less than 0.015 meq/g.

Having generally described this invention, a further understanding can be obtained by reference to certain specific examples which are provided herein for purposes of illustration only and are not intended to be limiting unless otherwise specified.

EXAMPLE 1 AND COMPARATIVE EXAMPLE C1

Moisture-cured films were prepared by casting neat isocyanate-terminated prepolymers onto a glass plate at a thickness of 30 mils and curing in the presence of atmospheric moisture for a period of 24 hours. The films were cured and conditioned at 73° F. (23° C.) and 50% relative humidity for at least four weeks prior to testing. In Example 1, a blend of ACCLAIM™ 4200 polyether polyol, a low unsaturation polyoxypropylene diol having a molecular weight of about 4200 Da and available from the ARCO Chemical Company was blended with diethylene glycol (molecular weight 116 Da) to produce a blend having an average molecular weight of c.a. 1000 Da. In Comparative Example C1, a single, low-unsaturation polyoxypropylene diol having a molecular weight of 1000 Da was used to prepare the isocyanate-terminated prepolymer. Prepolymer isocyanate group contents and physical properties of moisture-cured elastomers prepared from them are indicated below in Table 1.

TABLE 1

| EXAMPLE | 1 | C1 |
|---|---|---|
| Prepolymer Polyol: | ACCLAIM™ 4200 diol/diethylene glycol | 1000 Da low unsat. |
| Theory NCO | 6.23 | 6.23 |
| Actual NCO | 5.92 | 5.89 |
| Physical Properties: | | |
| 100% Modulus (psi) | 524 | 191 |
| 300% Modulus (psi) | 806 | 295 |
| Tensile Strength (psi) | 5100 | 1987 |
| Elongation (%) | 720 | 732 |
| Tear Strength (psi) | 333 | 97 |

The exceptional and dramatic increase in modulus, tensile strength, and tear strength of films obtained by moisture cure of prepolymers prepared using a high molecular weight polyoxypropylene diol and a low molecular weight glycol as compared to a single, low unsaturation polyoxypropylene glycol are not only surprising, but amazing.

EXAMPLES 2–5

In a manner similar to that of Example 1 and Comparative Example C1, additional moisture cured films were prepared. All employed an ACCLAIM™ 4200 polyoxypropylene diol/diethylene glycol blend to prepare the prepolymer. Isocyanate weight percents and elastomer properties are presented in Table 2 below.

TABLE 2

| EXAMPLE | 2 | 3 | 4 | 5 |
|---|---|---|---|---|
| Prepolymer Properties: | | | | |
| Theory NCO | 2.54 | 4.24 | 5.04 | 7.63 |
| Actual NCO | 2.44 | 4.09 | 4.84 | 7.30 |
| Physical Properties: | | | | |
| 100% Modulus (psi) | 61 | 289 | 290 | 1198 |
| 300% Modulus (psi) | 86 | 582 | 305 | 2123 |
| Tensile Strength (psi) | 1500 | 2300 | 4800 | 5650 |
| Elongation (%) | 280 | 848 | 710 | 540 |
| Tear Strength (psi) | 67 | 225 | 288 | 627 |

EXAMPLE 6 AND COMPARATIVE EXAMPLES C6a AND C6b

A series of isocyanate-terminated prepolymers were prepared from TDI and a diol component in a 2:1 molar ratio. The isocyanate content of the prepolymers was 6–6.2 weight percent NCO. Elastomers were prepared by chain extension of the prepolymers with MbOCA diamine curing agent. The elastomers were prepared by mixing the prepolymer and MbOCA curing agent at 105 index. The identity of the diol component, indentation hardness, and pendulum rebound are set forth in Table 3.

TABLE 3

| Example | Diol Used for Prepolymer | OH# | Elastomer Hardness | Pendulum Rebound |
|---|---|---|---|---|
| C6a | 1000 Da, conventional | 112 | 85 Shore A | 15% |
| C6b | 1000 Da, low unsaturation | 112 | 83 Shore A | 13% |
| 6 | 4000 Da, low | 112 | 90 Shore A | 58% |

TABLE 3-continued

| Example | Diol Used for Prepolymer | OH# | Elastomer Hardness | Pendulum Rebound |
|---|---|---|---|---|
| | unsaturation, and diethylene glycol | | | |

Note that the cast elastomer prepared from the low unsaturation diol (C6b) gave hardness and rebound which, within experimental error, is about the same as that of the elastomer prepared from the conventional diol. However, the mixture of low molecular weight diol and higher molecular weight, low unsaturation diol gave significantly higher hardness and much greater rebound, despite having the same hard segment content.

EXAMPLE 7 AND COMPARATIVE EXAMPLES C7a–C7b

A series of elastomers were prepared as in the preceding examples, but cured with MCDEA. The diol blend employed dipropylene glycol rather than diethylene glycol. The physical properties are produced below. The diol blend of low molecular weight diol and higher molecular weight, low unsaturation diol, once again gave significantly improved physical properties.

TABLE 4

| Example | Diol Used for Prepolymer | OH# | Elastomer Hardness | Pendulum Rebound |
|---|---|---|---|---|
| C7a | 1000 Da, conventional | 112 | 55 Shore A | 40% |
| C7b | 1000 Da, low unsaturation | 112 | 54 Shore A | 41% |
| 7 | 4000 Da, low unsaturation, and dipropylene glycol | 112 | 57 Shore A | 49% |

EXAMPLE 8 AND COMPARATIVE EXAMPLE C8

Two amine-extended cast elastomers were prepared from isocyanate terminated prepolymers prepared by reacting excess Mondur TDS with a diol blend. In Example 8, the diol blend consisted of ACCLAIM™ 4200 polyoxypropylene diol and diethylene glycol. In Comparative Example C8, the blend consisted of a c.a. 4025 Da molecular weight, conventionally base-catalyzed polyoxypropylene diol and diethylene glycol. Both blends had an average molecular weight of c.a. 2450 Da. Elastomers were prepared at 105 index using MCDEA as chain extender. Prepolymer NCO contents and cast elastomer properties are presented in Table 5 below.

TABLE 5

| EXAMPLE | 8 | C8 |
|---|---|---|
| Prepolymer Polyol: | Acclaim 4200/DEG | PPG4025/DEG |
| Prepolymer Properties: | | |
| Theory NCO | 3.00 | 3.00 |
| Actual NCO | 2.93 | 2.86 |
| Elastomer Physical | | |

TABLE 5-continued

| EXAMPLE | 8 | C8 |
|---|---|---|
| Properties: | | |
| Tensile Strength (psi) | 4400 | 2331 |
| Elongation (%) | 1050 | 1277 |
| Modulus 100% (psi) | 837 | 587 |
| Modulus 300% (psi) | 1262 | 962 |
| Tear Strength (pli) | 465 | 386 |
| Elongation Set | 25 | 100 |
| Hardness (Shore A) | 84 | 82 |
| Bashore Rebound | 65 | 61 |

As the results presented in Table 5 indicate, the subject invention prepolymers are capable of preparing elastomers with surprisingly superior properties as compared to elastomers prepared from polyol blends prepared from conventionally base-catalyzed polyoxypropylene diols. The tensile and tear strengths are significantly increased when employing the subject invention prepolymers, and the elongation set is lowered substantially as well. These results are particularly surprising in view of the fact that physical properties of amine-extended cast elastomers prepared from a single low unsaturation polyoxypropylene diol show virtually no improvement as compared to similar elastomers prepared from conventional, higher unsaturation, base-catalyzed polyoxypropylene diols.

Having now fully described the invention, it will be apparent to one of ordinary skill in the art that many changes and modifications can be made thereto without departing from the spirit or scope of the invention as set forth herein.

What is claimed is:

1. A polyurethane/urea elastomer comprising the reaction product of:
   a) an isocyanate-terminated prepolymer having an NCO group content of from about 2 weight percent to about 8 weight percent, prepared by the reaction of a stoichiometric excess of toluene diisocyanate with a polyol component comprising:
   a)i) one or more high molecular weight polyoxypropylene diols having an unsaturation of less than about 0.02 meq/g and a molecular weight greater than about 2000 Da; and
   a)ii) one or more low molecular weight diols having a molecular weight of less than about 400 Da,
   such that the hydroxyl number of said polyol component is in the range of 50 to 200; and
   b) a diamine chain extender; at an isocyanate index of from about 85 to 115.

2. The elastomer of claim 1 wherein said prepolymer has an NCO group content of from about 4 weight percent to about 7 weight percent.

3. The elastomer of claim 1 wherein at least one of said low molecular weight diols has a molecular weight less than about 150 Da.

4. The elastomer of claim 3 wherein said low molecular weight diol is selected from the group consisting of ethylene glycol, propylene glycol, diethylene glycol, dipropylene glycol, triethylene glycol, 2-methyl-1,3-propane diol, and mixtures thereof.

5. The elastomer of claim 1 wherein said low unsaturation polyoxypropylene diol has an unsaturation of less than about 0.015 meq/g, and a molecular weight of from 3000 Da to 8000 Da.

6. The elastomer of claim 1 wherein the hydroxyl number of the polyol component is in the range of from about 75 to about 150.

7. The elastomer of claim 1 wherein the hydroxyl number of the polyol component is in the range of from about 90 to about 120.

8. The elastomer of claim 1 wherein 70 mol percent or more of the low unsaturation polyoxypropylene diol has an unsaturation of less than about 0.01 meq/g.

9. The elastomer of claim 1 wherein said diamine chain extender comprises an aromatic diamine selected from the group consisting of sterically hindered aromatic diamines and electrically deactivated aromatic diamines.

10. The elastomer of claim 9 wherein said chain extender is selected from the group consisting of 4,4'-methylenebis (2-chloroaniline) and 4,4'-methylenebis(3-chloro-2,6-diethylaniline).

11. A method of preparing polyurethane/urea elastomers exhibiting improved rebound properties, comprising reacting:
   a) an isocyanate-terminated prepolymer having an NCO group content of from about 4 weight percent to about 8 weight percent, prepared by the reaction of a stoichiometric excess of toluene diisocyanate with a polyol component comprising:
      a)i) one or more high molecular weight polyoxypropylene diols having an unsaturation of less than about 0.02 meq/g and a molecular weight of greater than about 2000 Da; and
      a)ii) one or more low molecular weight diols having a molecular weight of less than about 400 Da,
   such that the hydroxyl number of said polyol component is in the range of 50 to 200; and
   b) a diamine chain extender;
   at an isocyanate index of from about 85 to 115.

12. The method of claim 11 wherein said prepolymer has an NCO group content of from about 4 weight percent to about 7 weight percent.

13. The method of claim 11 wherein at least one of said low molecular weight diols has a molecular weight less than about 150 Da.

14. The method of claim 13 wherein said low molecular weight diol is selected from the group consisting of ethylene glycol, propylene glycol, diethylene glycol, dipropylene glycol, triethylene glycol, 2-methyl-1,3-propane diol, and mixtures thereof.

15. The method of claim 11 wherein said low unsaturation polyoxypropylene diol has an unsaturation of less than about 0.015 meq/g, and a molecular weight of from 3000 Da to 8000 Da.

16. The method of claim 11 wherein the hydroxyl number of the polyol component is in the range of from about 75 to about 150.

17. The method of claim 11 wherein the hydroxyl number of the polyol component is in the range of from about 90 to about 120.

18. The method of claim 11 wherein 70 mol percent or more of the low unsaturation polyoxypropylene diol has an unsaturation of less than about 0.01 meq/g.

19. The method of claim 11 wherein said diamine chain extender comprises an aromatic diamine selected from the group consisting of sterically hindered aromatic diamines and electrically deactivated aromatic diamines.

20. The method of claim 19 wherein said chain extender is selected from the group consisting of 4,4'-methylenebis (2-chloroaniline) and 4,4'-methylenebis(3-chloro-2,6-diethylaniline).

21. An isocyanate terminated prepolymer suitable for preparing polyurethane/urea elastomers with improved physical properties, comprising the reaction product of a stoichiometric excess of toluene diisocyanate with a polyol component comprising:
   a) one or more high molecular weight polyoxypropylene diols having an unsaturation of less than about 0.02 meq/g and a molecular weight of greater than about 2000 Da; and
   b) one or more low molecular weight diols having a molecular weight of less than about 400 Da, such that the hydroxyl number of said polyol component is in the range of 50 to 200;
wherein said prepolymer has an isocyanate group content of from about 4 to about 8 weight percent.

22. The prepolymer of claim 21 wherein said polyoxypropylene diol has an unsaturation of less than about 0.010 meq/g, and at least one of said one or more low molecular diols has a molecular weight of about 150 or less.

23. The prepolymer of claim 21 wherein said polyol component has a hydroxyl number of about 75 to about 150.

24. The prepolymer of claim 21 wherein said polyoxypropylene diol has a molecular weight of from about 3000 Da to about 8000 Da.

25. A moisture-cured polyurethane/urea elastomer comprising the reaction product of:
   a) an isocyanate-terminated prepolymer having an NCO group content of from about 2 weight percent to about 8 weight percent, prepared by the reaction of a stoichiometric excess of toluene diisocyanate with a polyol component comprising:
      a)i) one or more high molecular weight polyoxypropylene diols having an unsaturation of less than about 0.02 meq/g and a molecular weight greater than about 2000 Da; and
      a)ii) one or more low molecular weight diols having a molecular weight of less than about 400 Da, such that the hydroxyl number of said polyol component is in the range of 50 to 200; and
   b) water vapor.

26. The elastomer of claim 25 wherein at least one of said low molecular weight diols has a molecular weight less than about 150 Da.

27. The elastomer of claim 25 wherein said low molecular weight diol is selected from the group consisting of ethylene glycol, propylene glycol, diethylene glycol, dipropylene glycol, triethylene glycol, 2-methyl-1,3-propane diol, and mixtures thereof.

* * * * *